United States Patent [19]
Axer et al.

[11] Patent Number: 5,285,370
[45] Date of Patent: Feb. 8, 1994

[54] CIRCUIT ARRANGEMENT FOR GENERATING A HIGH DC VOLTAGE

[75] Inventors: Klaus Axer, Lübeck; Klaus Sickert, Bonningstedt, both of Fed. Rep. of Germany

[73] Assignee: U.S. Philips Corporation, New York, N.Y.

[21] Appl. No.: 816,905

[22] Filed: Jan. 3, 1992

[30] Foreign Application Priority Data

Jan. 7, 1991 [DE] Fed. Rep. of Germany ....... 4100209

[51] Int. Cl.$^5$ .............................................. H02M 7/25
[52] U.S. Cl. ............................. 363/59; 363/60; 363/61; 363/89; 307/106; 307/110
[58] Field of Search ............... 363/59, 60, 61, 89; 323/313; 307/106, 107, 108, 110

[56] References Cited

U.S. PATENT DOCUMENTS

| | | | |
|---|---|---|---|
| 4,050,004 | 9/1977 | Greatbatch | 363/59 |
| 4,236,199 | 11/1980 | Stewart | 363/60 |
| 4,893,227 | 1/1990 | Gallios et al. | 363/26 |
| 4,992,922 | 2/1991 | Ishimura et al. | 363/59 |
| 5,053,727 | 10/1991 | Jann et al. | 363/61 |

OTHER PUBLICATIONS

IEEE Journal of Solid State Circuits vol. 11, No. 3, Jun. 1976 New York, pp. 374-378 John Dickson "On-Chip High Voltage Generation in NMOS IC Using an Improved Voltage Multiplier Technique".

*Primary Examiner*—Emanuel T. Voeltz
*Assistant Examiner*—Adolf Berhane
*Attorney, Agent, or Firm*—Bernard Franzblau

[57] ABSTRACT

A circuit arrangement for generating a high DC voltage utilizes a voltage multiplier cascade which requires two alternating, non-overlapping pulse trains which are generated by a pulse generator. For given applications, for example, contactless chip cards, the supply voltage is derived from an ac voltage induced into a coil and rectified by means of a bridge rectifier. This gives rise to a voltage drop. When the pulse generator operates utilizing the supply voltage, the amplitude of the output pulses is lower, i.e. a further voltage drop occurs. Therefore, in order to overcome this limitation, the pulse generator does not derive the pulses for feeding the cascade from the rectified operating voltage, but directly from the ac voltage. This results in a higher amplitude and a better efficiency. Another feature includes the blocking of the pulse generator so that it does not represent a load to the ac voltage.

20 Claims, 1 Drawing Sheet

CIRCUIT ARRANGEMENT FOR GENERATING A HIGH DC VOLTAGE

BACKGROUND OF THE INVENTION

This invention relates to a circuit arrangement for generating a supply voltage in the form of a dc voltage which is high relative to a reference voltage. The circuit comprises a chain of diode arrangements which are connected in series with one end of said clain delivering the high dc voltage, the junctions of the diode arrangements each being connected to a respective capacitor. The other terminals of the capaciters are connected alternately to another one of two pulse outputs of a pulse generator, non-overlapping pulses being generated at the pulse outputs.

A circuit arrangement of this kind is known from the publication "IEEE Journal of Solid-State Circuits", Vol. SC-11, No. 3, June 1976, pp. 374 to 378. The high voltage thus generated serves to power given circuit elements or circuit sections, for example, the so-called EEPROMs in a digital circuit arrangement. In the known circuit arrangement the pulse generator comprises an oscillator which controls the two pulse outputs of the pulse generator via two series-connected inverters. Overlapping of the pulses at the two pulse outputs is prevented by appropriate proportioning and the amplitude of the pulses generated at these outputs is inherently lower than the supply voltage.

Digital circuit arrangements are often powered by way of a comparatively high-ohmic ac voltage, via a bridge rectifier. An example of such an arrangement is the so-called contactless chip card where an integrated semiconductor circuit is inserted in a data carrier resembling a credit card, the data exchange and the powering of the circuit being realised via a single coil by way of an ac voltage of high frequency induced therein. This gives rise to some problems which necessitate special steps. Due to the construction and the operation of such a chip card in conjunction with an appropriate reading device and a coil contained therein, the coupling between the two coils is not very tight, so that the rectified supply voltage derived from the ac voltage may be loaded only to a small extent. Furthermore, the limited size of the coil makes the generation of comparatively high supply voltages difficult or almost impossible. Moreover, the value of the ac voltage and hence that of the dc voltage derived therefrom is not very constant and must be stabilized by way of special steps. The derived dc voltage, moreover, is lower than the amplitude of the ac voltage by an amount corresponding to the forward voltages of the bridge rectifier. Thus, when the described circuit arrangement is to be used in such a device, a comparatively large number of stages will be required in order to reach the necessary level of the high dc voltage in a reliable manner.

SUMMARY OF THE INVENTION

It is an object of the invention to provide a circuit arrangement of the kind set forth which operates as effectively as possible in conjunction with a device powered by a rectified ac voltage.

This object is achieved in accordance with the invention in that, when use is made of a device powered by an ac voltage, each pulse output of the pulse generator is coupled to another pole of the ac voltage and is connected, via a first switch, directly to the reference voltage, each first switch being controlled by the voltage at the respective other pole of the ac voltage.

Thus, the pulse generator does not utilize a local oscillator but the ac voltage itself is directly used to generate the non-overlapping pulses at the pulse outputs of the pulse generator. Furthermore, because each pulse output of the pulse generator is coupled directly to the relevant pole of the ac voltage, an additional voltage drop is avoided in the rectifier used for the dc powering of the remainder of the circuit, so that substantially the entire amplitude of the ac voltage is available as the amplitude of the pulses at the pulse outputs of the pulse generator. As a result, fewer stages are required in the voltage multiplier chain consisting of diodes and capacitor so that the efficiency is improved and the internal resistance of the arrangement is reduced. When a bridge rectifier is used as the rectifier for the dc voltage supply, the first switches may even be omitted or constitute a part of the bridge rectifier.

Devices of this kind which are powered by way of a comparatively high-ohmic ac voltage via a rectifier are customarily constructed using field effect transistors. In the most favourable case use is made of a complementary circuit technique, because such circuits operate with a very low power consumption. For such devices an embodiment of the circuit arrangement according to the invention is characterized in that the first switch is formed by an enhancement field effect transistor of one conductivity type whose gate is connected to the corresponding pole of the ac voltage. The switches and notably their drive, which may be realised by the direct connection of the gate to the corresponding voltages, can thus be particularly simply implemented. As a result, no further components are required and a compact construction is obtained.

However, the high voltage is not always required for all operating conditions. On the other hand, the generation of the high voltage requires a given power also in the event of a non-loaded output, which power represents an additional load to the comparatively high-ohmic ac voltage. Therefore, in order to reduce the load at the instants at which no high voltage is required, a further embodiment of the invention is characterized in that, in order to control the generation of the high voltage via a control voltage at a control input, each pulse output of the pulse generator is connected, via a second switch, directly to the relevant pole of the ac voltage and is controlled, via a third switch, by the difference between the voltage at the relevant pole and the reference voltage, the third switches being controlled by the control voltage. The operation of the pulse generator can thus be simply switched off, without noticeable current consumption still occurring. On the other hand, when the pulse generator is switched on, the second switch does not significantly reduce the pulse amplitude.

When this arrangement is to be used in a device based on field effect transistors, a further embodiment of the invention is characterized in that each first and each third switch is a first and a third field effect transistor, respectively, of one conductivity type, each second switch being a second field effect transistor of the other conductivity type, the gate of each first field effect transistor being connected to the corresponding pole of the ac voltage, the gate of the second field effect transistor being connected, via the third field effect transistor, to the reference voltage and, via a fourth field effect transistor of the other conductivity type, to the same pole of the ac voltage as the second field effect transistor, the gate of the third field effect transistor being connected to the control input and the gate of the fourth field effect transistor being connected to the associated pulse output. The switches required for switching off the pulse generator are thus very simply controlled without additional components being required. However, to prevent that in the case of a switched-off pulse generator, and hence turned-off third field effect transistors, the substantially open gates of the second field effect transistors, i.e. not low-ohmically terminated gates, turn on said second transistors by way of parasitic currents or capacitances, these gates are low-ohmically terminated by the fourth field effect transistor so that the second field effect transistors are definitely turned off. In the switched-on state of the pulse generator, the fourth field effect transistors are automatically turned off because the second field effect transistors are turned on.

The turning off of the second field effect transistors in the switched-off state of the pulse generator, however, is ensured only if the pulse outputs of the pulse generator actually remain substantially at the reference voltage, because otherwise it is not ensured that the fourth field effect transistor remains turned on. In order to provide increased reliability again as regards parasitic currents and capacitances, in a further embodiment of the invention a fifth field effect transistor is connected parallel to the first field effect transistor, its gate being connected to the control input via an inverter. Thus, a turned-on or turned-off state of the field effect transistors is ensured in the switched-on as well as the switched-off state of the pulse generator.

BRIEF DESCRIPTION OF THE DRAWINGS

Embodiments of the invention will be described in detail hereinafter with reference to the accompanying drawing in which.

DESCRIPTION OF THE PREFERRED EMBODIMENTS

Figure 1:
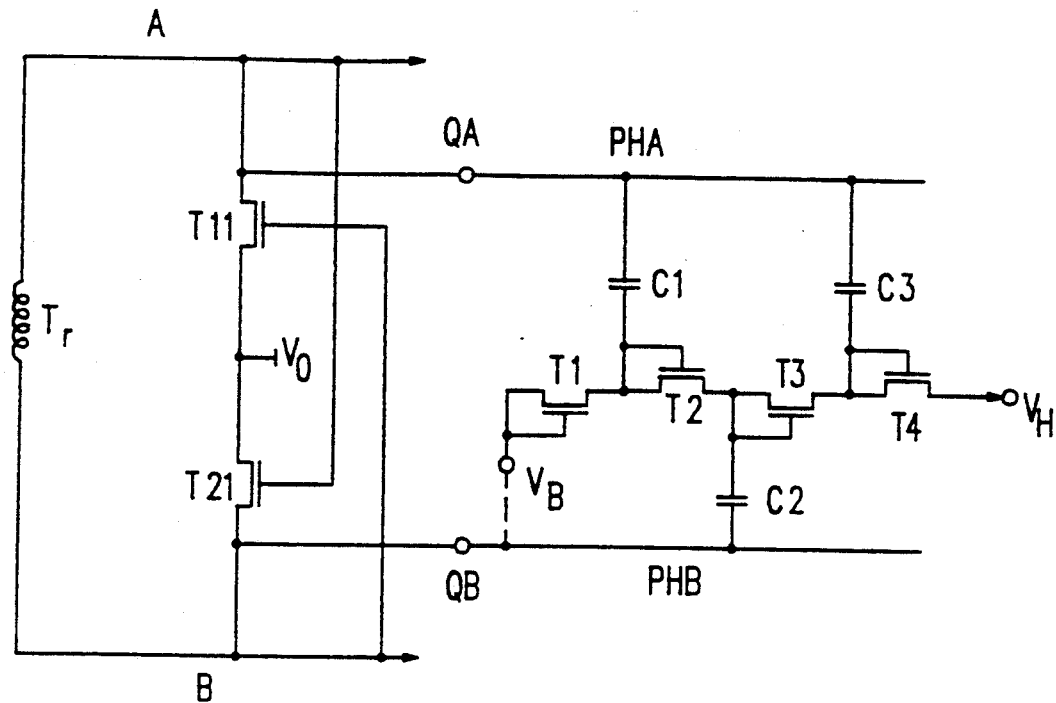
FIG. 1 shows the basic circuit diagram of the pulse generator, together with the beginning of the chain of diode arrangements and capacitors.

FIG. 1 shows a part of the known voltage multiplier chain consisting of the capacitors C1 to C3 and the transistors T1 to T4. The transistors T1 to T4 are enhancement MOS transistors whose gates are connected to a respective main current path. As a result, these transistors operate as diodes with a threshold voltage which is given by the threshold voltage of the transistors and which can be rendered low by way of an appropriate manufacturing process. In this respect it is assumed that n-conductivity transistors are used and that a positive high voltage is to be generated. The transistors T1 to T4 are connected in series relative to their main current path, the free end of the transistor T1 being connected to a reference voltage $V_B$ which need not necessarily be a dc voltage but which is formed by the pulses on the line PHB in the example shown. The terminal of the capacitor C2 which is not connected to the transistor chain is also connected to said line PHB, the corresponding terminals of the capacitors C1 and C3 being connected to the pulse line PHA. The pulse lines PHA and PHB carry voltage pulses which vary from approximately the level of the reference voltage $V_o$ to a maximum amplitude which should be as high as possible because it determines the maximum value of the high voltage $V_H$ at the output of the transistor T4, ignoring the number of stages. The number of stages should be as small as possible because the internal resistance of the voltage source for the voltage $V_H$ is then lowest and the efficiency is highest. When a higher output voltage is required, further stages can be connected to the output of the transistor T4.

The pulse lines PHA and PHB are fed by the pulse outputs QA and QB of a pulse generator which essentially comprises a direct connection between the pulse output QA and the pole A of the ac voltage induced into the transformer coil Tr, and a direct connection between the pulse output QB and the pole B of the ac voltage. Furthermore, two transistors T11 and T21 are connected between the pulse outputs QA and QB, respectively, and the reference voltage $V_o$, the gate of the transistor T11 being connected to the pole B while the gate of the transistor T21 is connected to the pole A of the ac voltage. Because a positive supply voltage and hence also a positive high dc voltage $V_H$ are assumed, the transistors T11 and T21 are n-type enhancement MOS transistors.

During operation, when the pole A is positive with respect to the pole B, the pulse voltage at the pulse output QA equals the voltage at the pole A for one halfwave, so that the pulse amplitude on the pulse line PHA has the maximum possible value. At the same time, the transistor T21 is turned on by its positive gate voltage, so that the pulse output QB, and hence also the pole B, assumes substantially the potential of the reference voltage $V_O$. The transistor T11 is turned off.

At the end of this halfwave the transistor T21 is turned off again when the voltage at the pole A, or at pulse output QA, drops below the threshold voltage of the transistor T21. For the next halfwave the pole B carries a positive voltage with respect to the pole A and corresponding processes occur for the transistor T11 and the pulse output QB. The pulse lines PHA and PHB thus alternately carry non-overlapping pulses having an amplitude which is substantially equal to the amplitude of the ac voltage between the poles A and B.

Figure 2:
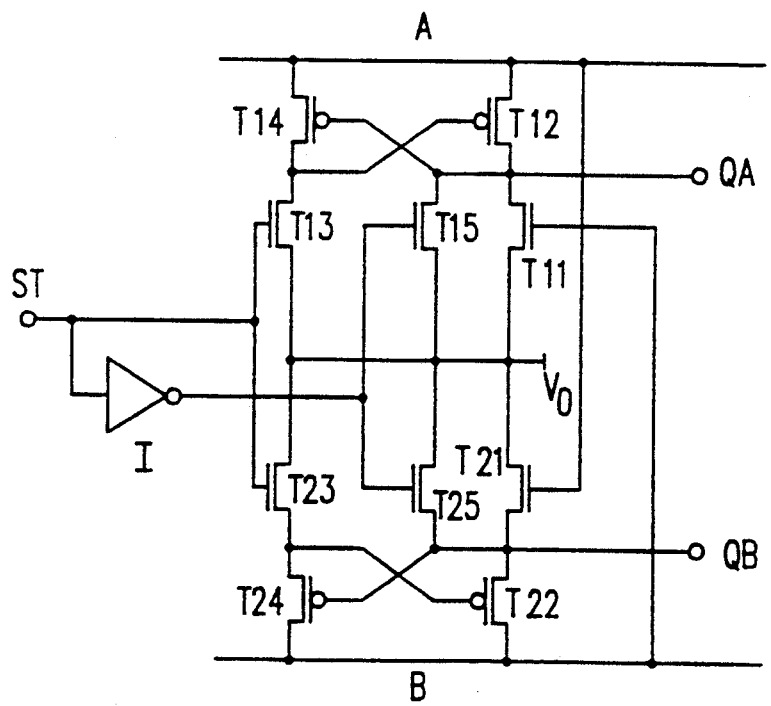
FIG. 2 shows an extension of the pulse generator which has a switch-off facility.

As appears from the foregoing description, each time the pole A or the pole B carrying the more negative voltage is connected to the reference voltage $V_o$, so that the transistors T11 and T21 serve substantially as a part of a bridge rectifier circuit for generating the supply dc voltage of a further circuit arrangement (not shown). As a result only two further diode arrangements are required between the poles of the ac voltage and the supply dc voltage in order to generate the supply dc voltage. However, this does not hold for the embodiment of the pulse generator shown in FIG. 2 which illustrates a simple way of switching off the operation of the pulse generator and hence the generation of the high voltage. Therein, the pulse outputs QA and QB are not directly connected to the two poles A and B, but rather via field effect transistors T12 and T22, respectively. Furthermore, the pulse generator comprises the enhancement field effect transistors T13 to T15 and T23 to T25 as well as the inverter I and the control input ST. The gates of the p-type transistors T12 and T22 are connected to the reference voltage $V_o$ via n-type transistors T13 and T23, respectively, whose gates are connected to the control input ST. Furthermore, the gates of the transistors T12 and T22 are connected, via a p-type transistor T14 and T24, respectively, to the relevant pole A and B, respectively, of the ac voltage. The gates of the transistors T14 and T24 are connected to the pulse outputs QA and QB, respectively, of the pulse generator which are furthermore connected, via a further n-type transistor T15 and T25, respectively, to the reference voltage $V_O$. The gates of the transistors T15 and T25 are connected to the control input ST via an inverter I.

When the control voltage at the control input ST is high, the transistors T13 and T23 are turned on and the transistors T15 and T25 are blocked. The gate of the transistor T12 or T22 is then connected to the reference voltage $V_O$, the gate of the transistor T14 or T24 being connected to the pole A or the pole B, respectively, of the ac voltage via the transistor T12 or T22, respectively, as soon as the latter is conductive, so that in this state of the control voltage at the control input ST the transistors T14 and T24 are substantially always turned off. The circuit shown in FIG. 2 thus has substantially the same function as the circuit shown in FIG. 1 in this state of the control voltage at the control input ST.

When the control voltage at the control input ST is low, the transistors T13 and T23 are turned off and the transistors T15 and T25 are turned on. As a result, both pulse outputs QA and QB carry substantially the reference voltage $V_O$, while the transistors T14 and T24 are alternately turned on for the two halfwaves of the ac voltage, thus turning on the transistors T12 and T22, respectively. As a result, substantially no current flows from the poles A and B to the reference voltage $V_O$ in this state of the control voltage at the control input ST so that the pulse generator does not represent a load in these circumstances.

We claim:

1. A circuit arrangement for generating a DC supply voltage which is high relative to a reference voltage, comprising; a chain of diode arrangements which are connected in series, one end of said chain delivering the high dc voltage, the junctions of the diode arrangements each being connected to a first terminal of a respective capacitor, the second terminals of the capacitors being connected alternately to first and second pulse outputs of a pulse generator which generates non-overlapping pulses at said pulse outputs, a source of ac voltage having two poles, each pulse output of the pulse generator being coupled to a respective pole of the ac voltage and being connected, via a respective first switch, directly to a reference voltage ($V_O$), each first switch being controlled by a voltage at a respective other pole of the ac voltage.

2. A circuit arrangement as claimed in claim 1, wherein each first switch comprises a first enhancement field effect transistor of one conductivity type whose gate is connected to a respective pole of the ac voltage.

3. A circuit arrangement as claimed in claim 1, wherein, in order to control the generation of the high voltage ($V_H$) via a control voltage at a control input, each pulse output of the pulse generator is connected, via a respective second switch, directly to its respective pole of the ac voltage and is controlled, via a respective third switch, by the difference between the voltage at the respective pole and the reference voltage ($V_O$), the third switches being controlled by the control voltage.

4. A circuit arrangement as claimed in claim 3, wherein said first and third switches comprise field effect transistors of one conductivity type, said second switch being a field effect transistor of the other conductivity type, the gate of each first field effect transistor being connected to the respective other pole of the ac voltage, the gate of each second field effect transistor being connected to the reference voltage ($V_O$) via a respective third field transistor and, via a respective fourth field effect transistor of the other conductivity type to the same pole of the ac voltage as the second field effect transistor, the gate of each third field effect transistor being connected to the control input (ST) and the gate of each fourth field effect transistor being connected to the associated pulse output.

5. A circuit arrangement as claimed in claim 4, wherein a respective fifth field effect transistor is connected parallel to a respective first field effect transistor, a gate of each fifth field effect transistor being connected to the control input via an inverter.

6. A high voltage generating circuit comprising:
first and second terminals for supplying an ac voltage to the circuit,
a voltage multiplier circuit including a chain of interconnected diodes and a plurality of capacitors coupled thereto,
first and second lines for supplying voltage pulses to said voltage multiplier circuit,
a first switching transistor connected between said first pulse line and a point of reference voltage,
a second switching transistor connected between said second pulse line and said point of reference voltage,
means for coupling said first and second pulse lines to said first and second ac voltage terminals, respectively,
wherein said first switching transistor is controlled by the voltage at the second ac voltage terminal and said second switching transistor is controlled by the voltage at the first ac voltage terminal, and
a high voltage output terminal connected to a last diode in said chain of diodes.

7. A high voltage generating circuit as claimed in claim 6 wherein said first and second terminals are coupled to an inductance element which supplies said ac voltage to said first and second terminals.

8. A high voltage generating circuit as claimed in claim 6 wherein said first switching transistor has a control electrode connected to the second ac voltage terminal and the second switching transistor has a control electrode connected to the first ac voltage terminal, whereby said first and second switching transistors are alternately switched on in mutually exclusive time intervals.

9. A high voltage generating circuit as claimed in claim 6 further comprising a control input terminal for a control voltage, and wherein
said coupling means comprises third and fourth switching transistors coupling said first and second voltage pulse lines to said first and second ac voltage terminals, respectively,
fifth and sixth switching transistors coupled between control electrodes of the third and fourth switching transistors, respectively, and said point of reference voltage, and
means for coupling control electrodes of the fifth and sixth switching transistors to said control input for controlling the switching of the fifth and sixth switching transistors.

10. A high voltage generating circuit as claimed in claim 9 further comprising:
a seventh transistor coupling the control electrode of the third transistor to the first ac voltage terminal, an eighth transistor coupling the control electrode of the fourth transistor to the second ac voltage terminal, and means connecting control electrodes of the seventh and eighth transistors to the first and second voltage pulse lines, respectively.

11. A high voltage generating circuit as claimed in claim 10 further comprising:

ninth and tenth transistors connected in parallel with the first and second switching transistors, respectively, and means coupling control electrodes of the ninth and tenth transistors to said control input via an inverter circuit.

12. A high voltage generating circuit as claimed in claim 10 wherein said first, second, fifth and sixth transistors are field effect transistors of one conductivity type and said third, fourth, seventh and eighth transistors are field effect transistors of the other conductivity type.

13. A high voltage generating circuit as claimed in claim 8 wherein said coupling means comprises first and second direct connection lines between said first and second voltage pulse lines and said first and second ac voltage terminals, respectively.

14. A high voltage generating circuit comprising:

a pulse generator for generating non-overlapping voltage pulses at first and second pulse outputs, and a voltage multiplier circuit coupled to said first and second pulse outputs and comprising a chain of intercoupled diodes and a plurality of capacitors coupled thereto, wherein said pulse generator comprises;

first and second lines for supplying an ac voltage, first and second switching transistors coupling said first and second ac voltage lines to a point of reference voltage, respectively, said first and second switching transistors being controlled by the voltages at the second and first ac voltage lines, respectively, means providing an essentially direct connection between the first and second ac voltage lines and the first and second pulse outputs, respectively, whereby the non-overlapping pulses generated at the first and second pulse outputs are substantially equal to the amplitude of the ac voltage between the first and second ac voltage lines, and a high voltage output terminal coupled to a last diode in said chain of diodes.

15. A high voltage generating circuit as claimed in claim 14 wherein said first and second switching transistors are controlled to operate in push-pull by connecting control electrodes of the first and second switching transistors directly to the second and first ac voltage lines, respectively, and the supply voltage for said pulse generator is derived directly from the ac voltage at said first and second ac voltage lines.

16. A high voltage generating circuit as claimed in claim 14 wherein said high voltage output terminal is decoupled from the pulse generator and the voltage multiplier circuit whereby the voltage multiplier circuit operates independently of the output voltage.

17. A high voltage generating circuit as claimed in claim 6, wherein said first and second switching transistors are controlled independently of a voltage developed at said high voltage output terminal.

18. A high voltage generating circuit as claimed in claim 6 further comprising:

second means for coupling said first switching transistor between said first ac voltage terminal and said point of reference voltage, and third means for coupling said second switching transistor between said second ac voltage terminal and said point of reference voltage.

19. A high voltage generating circuit as claimed in claim 18 wherein said first and second switching transistors comprise field effect transistors of one conductivity type and said second and third coupling means comprise field effect transistors of the opposite conductivity type to that of the first and second switching transistors.

20. A high voltage generating circuit as claimed in claim 6 further comprising means for selectively decoupling said first and second pulse lines from said first and second ac voltage terminals.

* * * * *